US011856572B2

(12) United States Patent
Berger et al.

(10) Patent No.: US 11,856,572 B2
(45) Date of Patent: Dec. 26, 2023

(54) TECHNIQUES FOR INTRA-MESSAGE ANTENNA SELECTION DIVERSITY

(71) Applicant: QUALCOMM Incorporated, San Diego, CA (US)

(72) Inventors: Peer Berger, Hod Hasharon (IL); Shay Landis, Hod Hasharon (IL); Idan Michael Horn, Hod Hasharon (IL); Assaf Touboul, Netanya (IL); Michael Levitsky, Rehovot (IL); Gideon Shlomo Kutz, Ramat Hasharon (IL); Jacob Pick, Beit Zayit (IL); Shlomit Shaked, Beer Sheva (IL)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/317,348

(22) Filed: May 11, 2021

(65) Prior Publication Data

US 2022/0369331 A1 Nov. 17, 2022

(51) Int. Cl.
*H04W 72/04* (2023.01)
*H04W 72/10* (2009.01)
*H04W 72/1263* (2023.01)
*H04B 1/713* (2011.01)

(52) U.S. Cl.
CPC ........ *H04W 72/1263* (2013.01); *H04B 1/713* (2013.01)

(58) Field of Classification Search
CPC ........... H04W 72/0446; H04W 72/046; H04W 72/20; H04W 72/1263; H04B 7/0456; H04B 7/0617; H04B 1/713; H04B 17/318; H04B 7/0408; H04B 7/0604
See application file for complete search history.

(56) References Cited

U.S. PATENT DOCUMENTS

2010/0303004 A1    12/2010  Mueck et al.
2016/0338095 A1*   11/2016  Faurie ................... H04W 72/23
2018/0131468 A1     5/2018  Blasco Serrano et al.
2018/0302141 A1*   10/2018  Kutz ....................... H04L 5/006
(Continued)

OTHER PUBLICATIONS

International Search Report and Written Opinion—PCT/US2022/024249—ISA/EPO—dated Jul. 15, 2022.
(Continued)

*Primary Examiner* — Romani Ohri
(74) *Attorney, Agent, or Firm* — Holland & Hart LLP

(57) ABSTRACT

Methods, systems, and devices for wireless communications are described. In a wireless communications system, a user equipment (UE) may be configured to use intra-message antenna selection diversity (ASD). The UE may transmit a first portion of a scheduled message within a time interval using a first antenna element of the UE based on an intra-message antenna diversity configuration. The intra-message antenna diversity configuration may indicate a set of antennas available for transmission of the scheduled message. In some cases, the UE may transmit, within the same time interval, at least a portion of the scheduled message using at least a second antenna element of the UE that is different from the first antenna element. In some cases, a receiving UE may decode the first portion and the second portion of the scheduled message based on the intra-message antenna diversity configuration.

30 Claims, 11 Drawing Sheets

(56) References Cited

U.S. PATENT DOCUMENTS

2019/0306835 A1* 10/2019 Hoang ................ H04W 72/53
2020/0336253 A1* 10/2020 He ...................... H04L 1/1887
2021/0127253 A1    4/2021 Fakoorian et al.
2022/0140964 A1*  5/2022 Chen .................. H04L 5/0048
                                                                 370/330
2022/0416874 A1* 12/2022 Man ................... H04B 7/0811

OTHER PUBLICATIONS

Kawai H., et al., "Performance Evaluation of Closed-Loop based Antenna Switching Transmit Diversity Associated with Frequency Domain Channel-Dependent Scheduling in E-UTRA Uplink", IEEE International Symposium on Personal, Indoor and Mobile Radio Communications, PIMRC, IEEE, PI, XX, Sep. 1, 2007, XP031168176, pp. 1-5.

Li J., et al., "A Transmit Antenna Selection Diversity Scheme for Wireless Cormnunications", Wireless Communications and Applied Computational Electromagnetics, 2005, IEEE/ACES International Conference on Honolulu, HI Apr. 3-7, 2005, Piscataway, NJ, USA, IEEE, Apr. 3, 2005, XP010826640, pp. 490-494.

* cited by examiner

TECHNIQUES FOR INTRA-MESSAGE ANTENNA SELECTION DIVERSITY

FIELD OF TECHNOLOGY

The following relates to wireless communications, including techniques for intra-message antenna selection diversity (ASD).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). A UE may implement techniques to increase frequency, time, code, and spatial diversity to improve communication quality. Techniques to improve spatial diversity may be deficient.

SUMMARY

The described techniques relate to improved methods, systems, devices, and apparatuses that support techniques for intra-message antenna selection diversity (ASD). Generally, the described techniques provide for a user equipment (UE) to use intra-message ASD within a single time interval (e.g., a single transmission time interval (TTI)), for example in broadcast cellular-vehicle-to-everything (CV2X) communications. In some examples, the UE may use intra-subframe ASD in Long Term Evolution (LTE) communications and intra-slot ASD in New Radio (NR) communications. In some cases, intra-message ASD may be referred to as intra-subframe ASD or intra-slot ASD, or both. For example, a transmitting UE may send a first portion of data (e.g., a first portion of a scheduled message) in a time interval using a first transmit antenna. The transmitting UE may change from the first transmit antenna to a second transmit antenna and transmit a second portion of the data within the same time interval using the second transmit antenna. As such, the transmitting UE may change the transmit antenna within the time interval in addition to or in lieu of changing the transmit antenna between time intervals. In order for the transmitting UE to use intra-message ASD, the receiving UE may utilize information regarding whether the transmitting UE is using intra-message ASD. For example, the receiving UE may determine which resource elements (REs) correspond to which antennas used by the transmitting UE. In some examples, the receiving UE may receive an indication of intra-message ASD via sidelink control information (SCI), radio resource control (RRC) signaling, or other signaling.

A method for wireless communication at a UE is described. The method may include transmitting a first portion of a scheduled message within a time interval for the scheduled message using a first antenna element of the UE based on an intra-message antenna diversity configuration for the UE, the intra-message antenna diversity configuration indicating a set of multiple antenna elements including the first antenna element available for transmission of the scheduled message and transmitting, within the time interval, at least a second portion of the scheduled message using at least a second antenna element of the UE that is different from the first antenna element, the second portion transmitted based on the intra-message antenna diversity configuration.

An apparatus for wireless communication at a UE is described. The apparatus may include a processor, memory coupled with the processor, and instructions stored in the memory. The instructions may be executable by the processor to cause the apparatus to transmit a first portion of a scheduled message within a time interval for the scheduled message using a first antenna element of the UE based on an intra-message antenna diversity configuration for the UE, the intra-message antenna diversity configuration indicating a set of multiple antenna elements including the first antenna element available for transmission of the scheduled message and transmit, within the time interval, at least a second portion of the scheduled message using at least a second antenna element of the UE that is different from the first antenna element, the second portion transmitted based on the intra-message antenna diversity configuration.

Another apparatus for wireless communication at a UE is described. The apparatus may include means for transmitting a first portion of a scheduled message within a time interval for the scheduled message using a first antenna element of the UE based on an intra-message antenna diversity configuration for the UE, the intra-message antenna diversity configuration indicating a set of multiple antenna elements including the first antenna element available for transmission of the scheduled message and means for transmitting, within the time interval, at least a second portion of the scheduled message using at least a second antenna element of the UE that is different from the first antenna element, the second portion transmitted based on the intra-message antenna diversity configuration.

A non-transitory computer-readable medium storing code for wireless communication at a UE is described. The code may include instructions executable by a processor to transmit a first portion of a scheduled message within a time interval for the scheduled message using a first antenna element of the UE based on an intra-message antenna diversity configuration for the UE, the intra-message antenna diversity configuration indicating a set of multiple antenna elements including the first antenna element available for transmission of the scheduled message and transmit, within the time interval, at least a second portion of the scheduled message using at least a second antenna element of the UE that is different from the first antenna element, the second portion transmitted based on the intra-message antenna diversity configuration.

In some examples of the method, apparatuses, and non-transitory computer-readable medium described herein, transmitting the second portion of the scheduled message may include operations, features, means, or instructions for transmitting the second portion of the scheduled message using resources different from resources used for transmitting the first portion.

In some examples of the method, apparatuses, and non-transitory computer-readable medium described herein, transmitting the second portion of the scheduled message may include operations, features, means, or instructions for transmitting the second portion of the scheduled message within the time interval using the second antenna element according to a frequency hopping pattern, where the first portion of the scheduled message may be transmitted within the time interval using the first antenna element according to the frequency hopping pattern.

Some examples of the method, apparatuses, and non-transitory computer-readable medium described herein may further include operations, features, means, or instructions for transmitting SCI indicating that the scheduled message may be transmitted based on the intra-message antenna diversity configuration.

Some examples of the method, apparatuses, and non-transitory computer-readable medium described herein may further include operations, features, means, or instructions for receiving control signaling from a base station configuring the intra-message antenna diversity configuration.

Some examples of the method, apparatuses, and non-transitory computer-readable medium described herein may further include operations, features, means, or instructions for applying the intra-message antenna diversity configuration based on a channel type of the scheduled message, a modulation and coding scheme (MCS) of the scheduled message, a doppler spread of a channel for the scheduled message, a channel estimation for the channel, or any combination thereof.

Some examples of the method, apparatuses, and non-transitory computer-readable medium described herein may further include operations, features, means, or instructions for applying the intra-message antenna diversity configuration based on a resource allocation of the scheduled message.

Some examples of the method, apparatuses, and non-transitory computer-readable medium described herein may further include operations, features, means, or instructions for applying the intra-message antenna diversity configuration to a subset of or all of a set of physical channels associated with the UE.

A method for wireless communication at a first UE is described. The method may include receiving, from a second UE, a first portion of a scheduled message within a time interval for the scheduled message, the first portion corresponding to a first antenna element of the second UE based on an intra-message antenna diversity configuration, receiving, within the time interval, a second portion of the scheduled message corresponding to a second antenna element of the second UE that is different from the first antenna element based on the intra-message antenna diversity configuration, and decoding the first portion and the second portion of the scheduled message according to the intra-message antenna diversity configuration.

An apparatus for wireless communication at a first UE is described. The apparatus may include a processor, memory coupled with the processor, and instructions stored in the memory. The instructions may be executable by the processor to cause the apparatus to receive, from a second UE, a first portion of a scheduled message within a time interval for the scheduled message, the first portion corresponding to a first antenna element of the second UE based on an intra-message antenna diversity configuration, receive, within the time interval, a second portion of the scheduled message corresponding to a second antenna element of the second UE that is different from the first antenna element based on the intra-message antenna diversity configuration, and decode the first portion and the second portion of the scheduled message according to the intra-message antenna diversity configuration.

Another apparatus for wireless communication at a first UE is described. The apparatus may include means for receiving, from a second UE, a first portion of a scheduled message within a time interval for the scheduled message, the first portion corresponding to a first antenna element of the second UE based on an intra-message antenna diversity configuration, means for receiving, within the time interval, a second portion of the scheduled message corresponding to a second antenna element of the second UE that is different from the first antenna element based on the intra-message antenna diversity configuration, and means for decoding the first portion and the second portion of the scheduled message according to the intra-message antenna diversity configuration.

A non-transitory computer-readable medium storing code for wireless communication at a first UE is described. The code may include instructions executable by a processor to receive, from a second UE, a first portion of a scheduled message within a time interval for the scheduled message, the first portion corresponding to a first antenna element of the second UE based on an intra-message antenna diversity configuration, receive, within the time interval, a second portion of the scheduled message corresponding to a second antenna element of the second UE that is different from the first antenna element based on the intra-message antenna diversity configuration, and decode the first portion and the second portion of the scheduled message according to the intra-message antenna diversity configuration.

In some examples of the method, apparatuses, and non-transitory computer-readable medium described herein, decoding the second portion of the scheduled message may include operations, features, means, or instructions for decoding the second portion of the scheduled message based on a second channel estimation associated with the second antenna element, where the first portion of the scheduled message may be decoded based on a first channel estimation associated with the first antenna element.

In some examples of the method, apparatuses, and non-transitory computer-readable medium described herein, receiving the second portion of the scheduled message may include operations, features, means, or instructions for receiving the second portion of the scheduled message within the time interval according to a frequency hopping pattern, where in the first portion of the scheduled message may be received within the time interval according to the frequency hopping pattern.

Some examples of the method, apparatuses, and non-transitory computer-readable medium described herein may further include operations, features, means, or instructions for receiving SCI indicating that the scheduled message may be transmitted according to the intra-message antenna diversity configuration.

Some examples of the method, apparatuses, and non-transitory computer-readable medium described herein may further include operations, features, means, or instructions for receiving control signaling from a base station configuring the intra-message antenna diversity configuration.

In some examples of the method, apparatuses, and non-transitory computer-readable medium described herein, the first portion of the scheduled message and the second portion of the scheduled message may be decoded according to the intra-message antenna diversity configuration based on a channel type of the scheduled message, an MCS of the scheduled message, a doppler spread of a channel for the scheduled message, a channel estimation for the channel, a resource allocation of the scheduled message, or any combination thereof.

In some examples of the method, apparatuses, and non-transitory computer-readable medium described herein, the first portion of the scheduled message and the second portion of the scheduled message may be decoded according to the intra-message antenna diversity configuration based on a resource allocation of the scheduled message.

DETAILED DESCRIPTION

Figure 1:
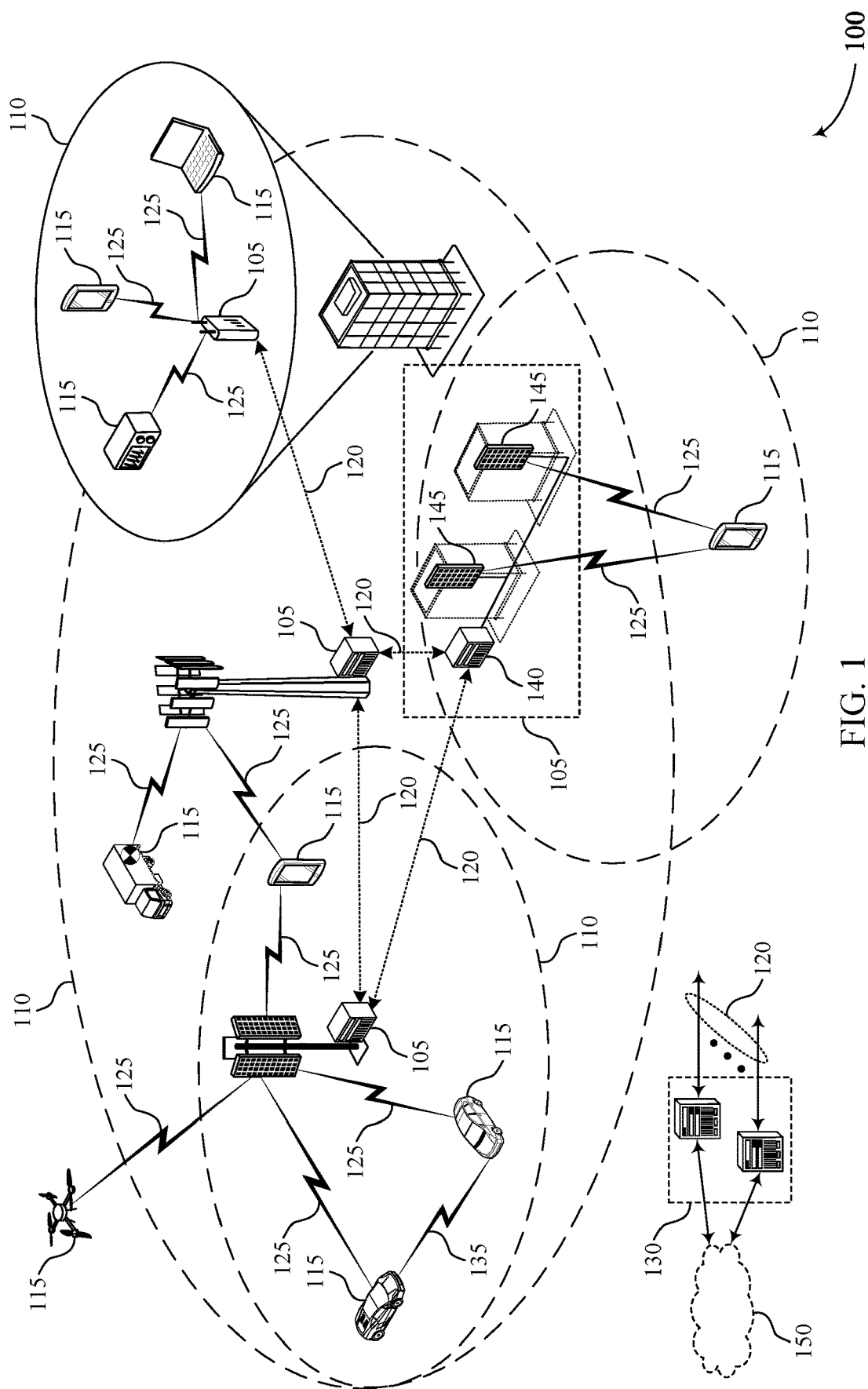
FIG. 1 illustrates an example of a wireless communications system that supports techniques for intra-message antenna selection diversity (ASD) in accordance with aspects of the present disclosure.

In some wireless communications systems, a transmitting device (e.g., a user equipment (UE), a base station) may use a form of diversity (e.g., frequency, time, spatial, coding) to increase the likelihood that a receiving UE may receive and successfully decode a transmission. For example, a data transmission may be blocked (e.g., by a cluster such as a building) and therefore may not be successfully received at the receiving UE. To increase a likelihood that the receiving UE successfully receives a transmission, the transmitting UE may increase a spatial diversity of the transmission. For example, the transmitting UE may send different portions of the data using multiple different time, frequency, spatial, or coding domains. In some examples, the transmitting UE may use spatial diversity to transmit multiple repetitions of the data, where the data may be sent over multiple antennas.

In some cases (e.g., in cellular-vehicle-to-everything (CV2X) communications), the transmitting UE may use antenna selection diversity (ASD). For some examples of ASD, the transmitting UE may send hybrid automatic repeat request (HARD) feedback with a different transmit antenna for each transmission. In some examples, the transmitting UE may use ASD to use a different antenna for each different time interval (e.g., subframe) used to transmit the data. For example, the transmitting UE may use a first antenna element for a first transmission in a first time interval and a second, different antenna element for a second transmission in a second time interval.

Techniques described herein enable a UE to use intra-message ASD, which may provide spatial diversity within a single subframe or within a single slot, mini-slot, symbol, or other time interval. For example, in CV2X communications, the transmitting UE may use ASD within a single time interval (e.g., a single transmission time interval (TTI)). In some examples, the UE may use intra-message ASD in long-term evolution (LTE) communications and intra-slot ASD in new radio (NR) communications. In some cases, the UE may use ASD between two symbols or between different resource elements (REs) of a message in a single time interval (e.g., a single slot or single subframe). In some cases, the transmitting UE may send a first portion of data (e.g., a first portion of a scheduled message) in a time interval using a first transmit antenna. After one or more symbols of the time interval, the transmitting UE may change from the first transmit antenna to a second antenna and may transmit the second portion of the data within the same time interval using the second antenna.

As such, the transmitting UE may change the transmit antenna during a time interval in addition to (or in lieu of) changing the transmit antenna between time interval. In some cases, using ASD within a single time interval may increase spatial diversity for that corresponding time interval and may improve overall transmission results (e.g., improve the likelihood of the receiving UE successfully receiving and decoding a transmission). In some cases, intra-message ASD may be enabled for some or all types of physical channels (e.g., physical sidelink control channels (PSCCHs), physical sidelink shared channels (PSSCHs)) in CV2X. In some cases, a UE may use intra-message ASD within the same frequency resource allocation or with frequency hopping. Additionally, or alternatively, a UE may use intra-message ASD with simultaneous frequency resources, such that a first transmit antenna may transmit using a first set of resources (e.g., even numbered REs) and a second transmit antenna may transmit using a second, different set of resources (e.g., odd numbered REs.)

In some cases, the transmitting UE and the receiving UE may determine that the transmitting UE is applying intra-message or intra-slot ASD techniques. For example, the receiving UE may determine which portions of a data message in a time interval are transmitted using which antenna elements. For example, the receiving UE may determine that a first portion of the data message in the time interval is transmitted using a first antenna element, and a second portion of the data message in the time interval is transmitted using a second antenna element. The receiving UE may determine how the intra-message ASD technique is performed in order to coherently decode the message. In some examples, the receiving UE may receive an indication of intra-message ASD via sidelink control information (SCI), radio resource control (RRC) signaling, or other methods.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to techniques for intra-message ASD.

FIG. 1 illustrates an example of a wireless communications system 100 that supports techniques for intra-message ASD in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, an RE may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support communication between one or more communication devices. For example, the wireless communications system 100 may support sidelinks for communications between a UE 115 and another UE 115. A sidelink may refer to any communication link between similar wireless devices (e.g., a communication link between UEs 115). It is noted that while various examples provided herein are discussed for UE 115 sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, CV2X communications, message relaying, discovery signaling, beacon signaling, or other signals transmitted over-the-air from one UE 115 to one or more other UEs 115.

In some cases, a transmitting device (e.g., a UE 115, a base station 105) may use a form of diversity (e.g., frequency, time, spatial, coding) to increase the likelihood that a receiving UE 115 may receive and successfully decode a transmission. For example, a transmitting UE 115 may transmit a first data transmission data and a second data transmission (e.g., a retransmission). In some cases, the first data transmission may not be successfully received at the receiving UE 115 (e.g., if a transmit antenna is blocked by a building), but the retransmission may successfully be received at the receiving UE 115. As such, to ensure that the receiving UE 115 successfully receives a data transmission, the transmitting UE 115 may send different portions of the data using multiple different time, frequency, spatial, or coding domains. In some examples, the transmitting UE 115 may use spatial diversity to transmit multiple portions or repetitions of the data over multiple different antennas. In some cases, such as in CV2X communications, the transmitting UE 115 may use ASD to send different portions of data over different transmit antennas. In some examples, the transmitting UE 115 may use a different transmit antenna for each different time interval used to transmit the data (e.g., the transmitting UE 115 may use ASD across multiple time intervals).

In some examples, a transmitting UE 115 may use intra-message (e.g., intra-message or intra-slot) ASD. For example, in CV2X communications, the transmitting UE 115 may use ASD within a single time interval (e.g., subframe, slot, symbol, or other TTI), where the transmitting UE 115 may change the transmit antenna in the middle of the time interval in addition to changing the transmit antenna between time intervals. In some cases, using ASD within a single time interval may increase spatial diversity for that corresponding time interval and may improve overall transmission results (e.g., improve the likelihood of the receiving UE 115 successfully receiving and decoding a transmission). In some cases, intra-message ASD may be enabled for some or all types of physical channels (e.g., a PSCCH, a PSSCH) in CV2X. In some cases, the receiving UE 115 may utilize information regarding whether the transmitting UE 115 is using intra-message ASD (e.g., which REs the transmitting UE 115 transmits on the same antenna).

Figure 2:
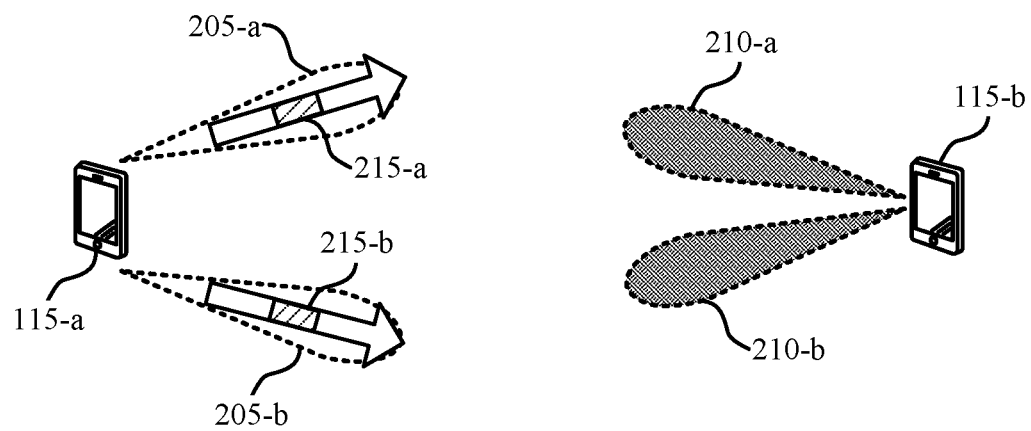
FIG. 2 illustrates an example of a wireless communications system that supports techniques for intra-message ASD in accordance with aspects of the present disclosure.
Figure 2:
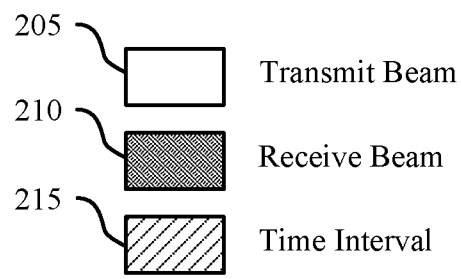

FIG. 2 illustrates an example of a wireless communications system 200 that supports techniques for intra-message ASD in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a and a UE 115-b, which may be examples of a UE as described herein. The wireless communications system 200 may include features for improved communications between the UEs 115, among other benefits.

In some cases, the wireless communications system 100 may support sidelink communications between two or more UEs 115 in CV2X communications. For example, the UE 115-a (a transmitting UE 115) and the UE 115-b (a receiving UE 115) may communicate via one or more sidelink channels on a sidelink. To ensure that the UE 115-b successfully receives a data transmission (e.g., a scheduled message), the UE 115-a may use spatial diversity to transmit different portions of the data (e.g., HARQ) over different antennas. For example, the UE 115-a may transmit a first portion of data over the sidelink and may transmit a second portion of the data over the sidelink to the UE 115-b.

In some cases, the UE 115-a may transmit the data using transmit beams 205, which may correspond to respective antennas at the UE 115-a. In some cases, the UE 115-b may receive the transmissions using receive beams 210. For example, the UE 115-a may transmit the first portion of the data via a transmit beam 205-*a* and the second portion of the data via a transmit beam 205-*b*, and the UE 115-*b* may receive the two portions of data via the receive beam 210-*a* and the receive beam 210-*b*, respectively. In some examples, the UE 115-*a* may transmit HARQ feedback with a first redundancy version (RV) (e.g., RV0) in a first transmission using the transmit beam 205-*a* (e.g., corresponding to antenna 0) and HARQ feedback with a second RV (e.g., RV2) in a second transmission using the transmit beam 205-*b* (e.g., corresponding to antenna 1). In some cases, transmitting HARQ (e.g., without ASD) may provide the UEs 115 some frequency, time, and code diversity. Transmitting HARQ using ASD may add spatial diversity, which may benefit communications between the UEs 115 in transmission imbalance scenarios or low doppler spread scenarios (e.g., high time correlation scenarios in broadcast systems such as CV2X).

In some cases, in CV2X communications, the UE 115-*a* may use intra-message ASD, in which the UE 115-*a* may use ASD within a single time interval 215. The time interval 215 may be a subframe, a slot, a mini-slot, or a different TTI. For example, the UE 115-*a* may transmit different portions of data using the transmit beams 205 and corresponding sidelink links and may transmit both portions of the data in the same time interval 215 over both transmit beams 205. In some cases, the UE 115-*a* may use ASD within a single TTI such as a slot or a different TTI. Using intra-message ASD, the UE 115-*a* may change the transmit antenna during or within a time interval, not only between time intervals, which may increase spatial diversity for that corresponding time interval and, in some cases, improve transmission results (e.g., increase the likelihood of the UE 115-*b* successfully receiving transmissions). In some cases, techniques herein are described in the context of intra-message ASD. Such techniques may similarly be applied for intra-message ASD, intra-slot ASD, or intra-TTI ASD, inter-symbol ASD, or any combination thereof.

In some other examples, other types of intra-message ASD may be applied. For example, the UE 115-*a* may transmit a message on a first set of resources (e.g., a first set of frequency resources) in a time interval using a first antenna element, and the UE 115-*a* may transmit the message on a second set of resources (e.g., a second set of frequency resources) in the time interval using a second antenna element. In this example, the UE 115-*a* may transmit different portions of the message within the slot at the same time on different frequency resources. In some cases, time-based intra-message ASD techniques or frequency-based intra-message ASD techniques, or both, may implemented.

In some cases, intra-message ASD may be enabled for some or all types of physical channels (e.g., PSCCH, PSSCH) in CV2X. In some cases, the UE 115-*a* may use intra-message ASD within the same frequency allocation or using frequency hopping. For example, the UE 115-*a* may use the same frequency or a different frequency for transmissions using the two or more antennas in ASD (e.g., a first antenna corresponding to the transmit beam 205-*a* and a second antenna corresponding to the transmit beam 205-*b*). In some examples, the UE 115-*a* may use the two or more antennas for ASD simultaneously by dividing all transmitted REs between the antennas. For example, the first antenna (e.g., corresponding to the transmit beam 205-*a*) may transmit even numbered REs and the second antenna (e.g., corresponding to the transmit beam 205-*b*) may transmit odd numbered REs.

In some examples, the UE 115-*b* may determine whether the UE 115-*a* is using intra-message ASD. For example, the UE 115-*b* may determine which antenna corresponds to which portion of a message (e.g., which REs) to coherently decode the message from the UE 115-*a*. If the UE 115-*b* does not determine the intra-message ASD is applied, the UE 115-*b* may be unable to coherently decode the message. In some cases, the UE 115-*b* may use information regarding whether the UE 115-*a* is using intra-message ASD to decode transmissions. For example, the UE 115-*b* may estimate several parameters (e.g., time resources, frequency resources, channel estimation, pilot interpolations, etc.) based on the knowledge of which transmit antennas the UE 115-*a* may have used to transmit the REs. In some cases, different transmit antennas may correspond to different transmit beams (e.g., different transmit beams 205) and in some cases, different transmit antennas may correspond to the same transmit beams (e.g., the same transmit beam 205).

In some cases, the UE 115-*b* may receive SCI including information that the UE 115-*a* is using intra-message ASD. If the information is included in a control channel (e.g., a physical sidelink control channel (PSCCH)) for example, then the intra-message ASD may be used for a shared channel (e.g., a PSSCH) and not for the control channel. Additionally, or alternatively, whether the UE 115-*a* may use intra-message ASD may be preconfigured (e.g., fixed) for the control channel and the shared channel, for example using a modulation and coding scheme (MCS) or a resource allocation. In some cases, the UE 115-*a* may determine to use intra-message ASD in a PSCCH or a PSSCH based on a lookup table. In some cases, intra-message ASD may be configured (e.g., by a base station) using RRC signaling.

In some examples, intra-message ASD may be enabled dynamically for the UE 115-*a*. In some cases, the UE 115-*a* may determine which intra-message ASD options to use (e.g., intra-message ASD enabled for some or all channels, one or more frequencies, and so on). As such, the UE 115-*b* may assume the UE 115-*a* is using intra-message ASD whether or not intra-message ASD is actually used. For example, the UE 115-*b* may not assume which REs the UE 115-*a* may have transmitted on which antenna (e.g., which transmit beam 205), but may assume that the UE 115-*a* is using intra-message ASD to allow for the UE 115-*a* to receive any REs via receive beams 210 from any transmit beam 205. In some cases, the UE 115-*b* may determine if intra-message ASD is used by the transmitter for a scheduled message based on some transmit parameter estimates. For example, the UE 115-*b* may determine whether intra-message ASD is used by the transmitter for a scheduled message based on a channel type of the scheduled message, an MCS of the scheduled message, a doppler spread of a channel for the scheduled message, a channel estimation for the channel, or any combination thereof.

In some examples, intra-message ASD may be implemented digitally (e.g., without using antenna switching). For example, the UE 115-*a* may implement some MCS, beam parameters, digital antenna configuration, or any combination thereof, to digitally perform intra-message ASD. In some cases, digital intra-message ASD may be implemented by using a single antenna element, though the transmitting device may generate beams similar to using beamforming vectors for multiple antenna elements.

The wireless communications system 200 may provide an example of the UEs 115 communicating using intra-message ASD. For example, the UE 115-*a* may enable intra-message ASD within the same frequency allocation, and the UE 115-*b* may be aware (e.g., may assume) that the UE 115-*a* is using intra-message ASD (e.g., via a fixed parameter, RRC signaling). The UE 115-a may transmit a message in a time interval 215 using two different antenna elements. For example, the UE 115-a may transmit a first portion of data in a first portion of the time interval 215-a using the transmit beam 205-a. In some cases, in the middle of the time interval 215 (e.g., after 3 symbols, after 4 symbols, etc.), the UE 115-a may change the antenna originally used to transmit (e.g., from the transmit beam 205-a corresponding to a first antenna to the transmit beam 205-b corresponding to a second antenna) and transmit a second portion of the data in a second portion of the time interval 215-b using the second antenna in the same time interval 215. In some cases, the UE 115-a may change the antenna element being used to transmit the message during a slot (e.g., after a number of symbols within the slot). Having assumed that the UE 115-a may use intra-message ASD, the UE 115-b may receive the data using the receive beams 210 and may refrain from merging the two portions of the data from different transmit beams 205. Instead, the UE 115-b may receive and estimate the data separately (e.g., as the first portion and the second portion).

Figure 3:
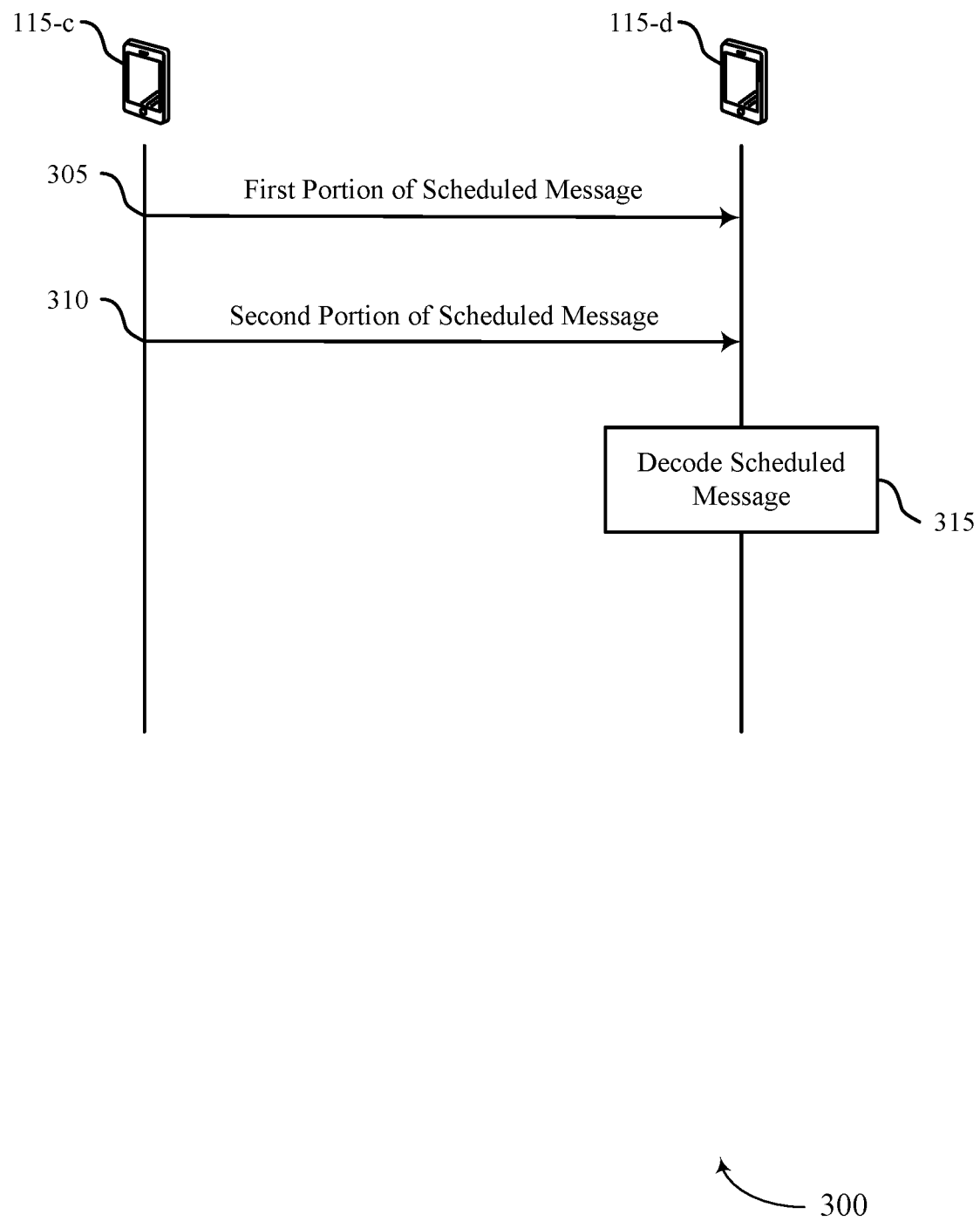
FIG. 3 illustrates an example of a process flow that supports techniques for intra-message ASD in accordance with aspects of the present disclosure.

FIG. 3 illustrates an example of a process flow 300 that supports techniques for intra-message ASD in accordance with aspects of the present disclosure. The process flow 300 may implement aspects of wireless communications systems 100 and 200, or may be implemented by aspects of the wireless communications system 100 and 200. For example, the process flow 300 may illustrate operations between a UE 115-c and a UE 115-d, which may be examples and a UE 115 as described with reference to FIGS. 1 and 2. In the following description of the process flow 300, the operations between the UE 115-c and the UE 115-d may be transmitted in a different order than the example order shown, or the operations performed by the UE 115-c and the UE 115-d may be performed in different orders or at different times. Some operations may also be omitted from the process flow 300, and other operations may be added to the process flow 300.

At 305, the UE 115-c (e.g., a transmitting UE 115) may transmit a first portion of a scheduled message within a time interval (e.g., a subframe or a slot) for the scheduled message using a first antenna element of the UE 115-c based on an intra-message ASD configuration. The intra-message ASD configuration may indicate a set of antenna elements available for transmission of the scheduled message In some cases, the intra-message ASD configuration may be indicated to the UE 115-c or the UE 115-d, or both, via control signaling from a base station, such as RRC signaling or downlink control information. In some cases, the UE 115-c may use intra-message ASD in CV2X communications.

At 310, the UE 115-c may transmit, within the time interval, at least a second portion of the scheduled message using at least a second antenna element of the UE 115-c that is different from the first antenna element. In some cases, the second portion of the scheduled message may be transmitted based on the intra-message ASD configuration. For example, the UE 115-c may use intra-message ASD such that during the time interval, the UE 115-c may change from the first antenna element to the second antenna element, and may transmit the second portion of the scheduled message within the same time interval using the second antenna element. Additionally, or alternatively, the UE 115-c may transmit the second portion of the scheduling message using resources different from resources used for transmitting the first portion. For example, the UE 115-c may transmit the first portion of the scheduled message using the first antenna element on a first set of REs, and the UE 115-c may transmit the second portion of the scheduled message using the second antenna element on a second set of REs.

At 315, the UE 115-d (e.g., a receiving UE 115) may decode the first portion and the second portion of the scheduled message according to the intra-message ASD configuration. In some cases, the UE 115-d may receive an indication (e.g., via SCI, control signaling) that the UE 115-c is using intra-message ASD, where the UE 115-d decode the scheduled message based on the indication. In some cases, the UE 115-d may decode the first portion of the scheduled message based on a first channel estimate associated with the second antenna element and decode the second portion of the scheduled message based on a second channel estimate associated with the second antenna element.

Figure 4:
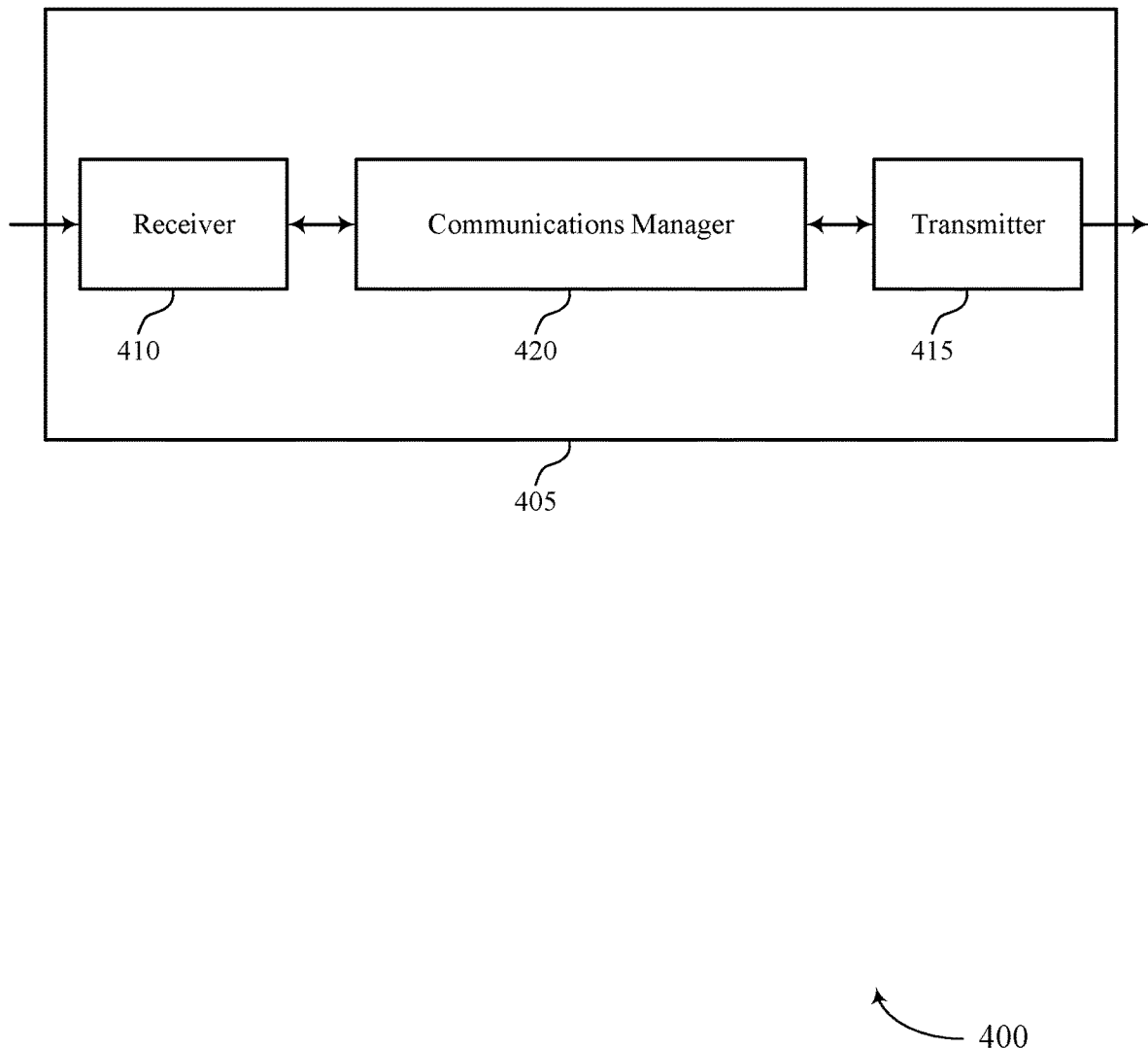
FIGS. 4 and 5 show block diagrams of devices that support techniques for intra-message ASD in accordance with aspects of the present disclosure.

FIG. 4 shows a block diagram 400 of a device 405 that supports techniques for intra-message ASD in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for intra-message ASD). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for intra-message ASD). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for intra-message ASD as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for transmitting a first portion of a scheduled message within a time interval for the scheduled message using a first antenna element of the UE based on an intra-message antenna diversity configuration for the UE, the intra-message antenna diversity configuration indicating a set of multiple antenna elements including the first antenna element available for transmission of the scheduled message. The communications manager 420 may be configured as or otherwise support a means for transmitting, within the time interval, at least a second portion of the scheduled message using at least a second antenna element of the UE that is different from the first antenna element, the second portion transmitted based on the intra-message antenna diversity configuration.

Additionally, or alternatively, the communications manager 420 may support wireless communication at a first UE in accordance with examples as disclosed herein. For example, the communications manager 420 may be configured as or otherwise support a means for receiving, from a second UE, a first portion of a scheduled message within a time interval for the scheduled message, the first portion corresponding to a first antenna element of the second UE based on an intra-message antenna diversity configuration. The communications manager 420 may be configured as or otherwise support a means for receiving, within the time interval, a second portion of the scheduled message corresponding to a second antenna element of the second UE that is different from the first antenna element based on the intra-message antenna diversity configuration. The communications manager 420 may be configured as or otherwise support a means for decoding the first portion and the second portion of the scheduled message according to the intra-message antenna diversity configuration.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for a UE to use intra-message ASD, which may increase frequency diversity within a time interval. Intra-message ASD may improve the likelihood that a receiving UE may successfully receive and decode transmissions and may improve transmission diversity. As such, supported techniques may include improved network operations and, in some examples, may promote network efficiencies, among other benefits.

Figure 5:
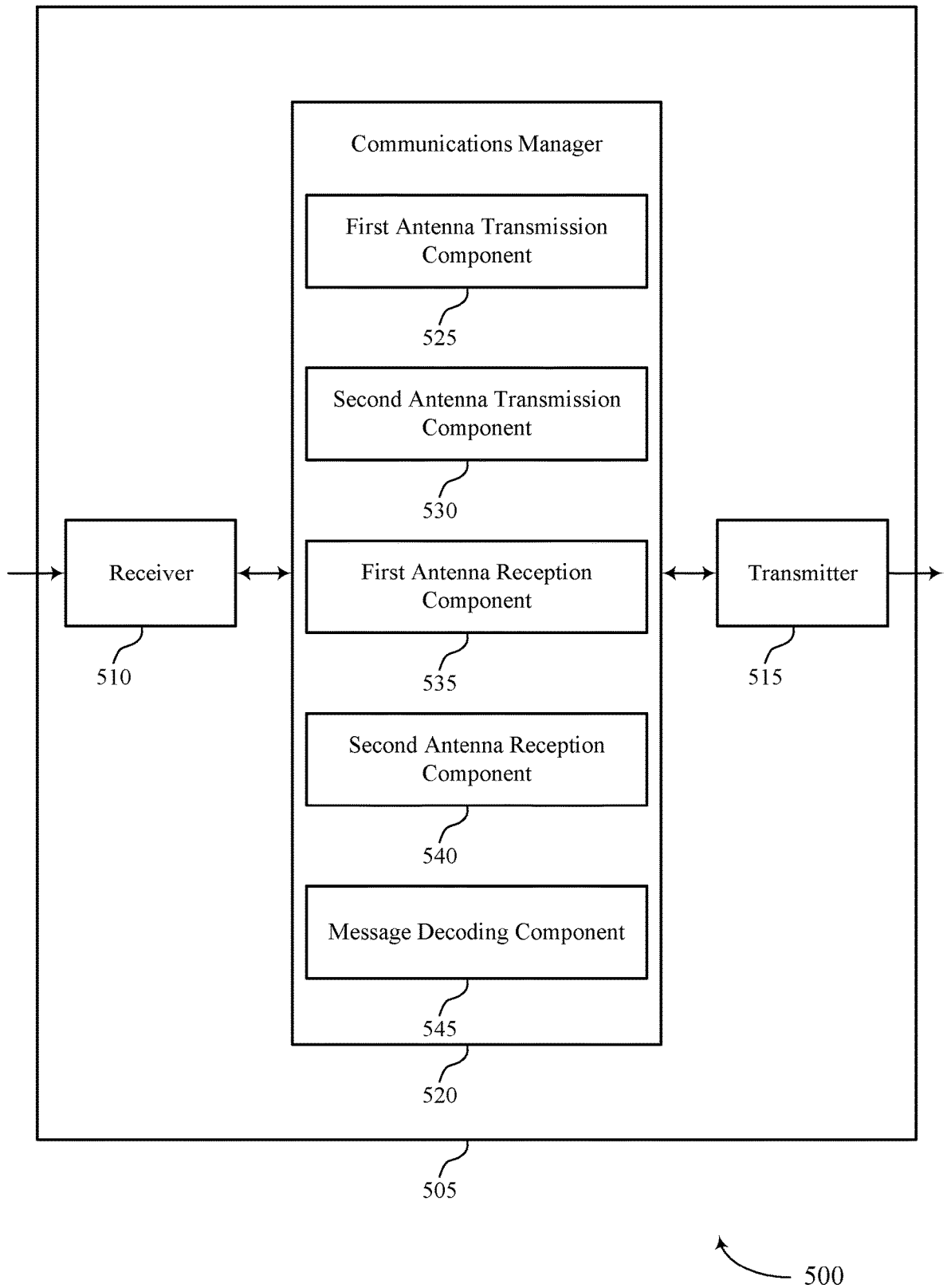

FIG. 5 shows a block diagram 500 of a device 505 that supports techniques for intra-message ASD in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for intra-message ASD). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for intra-message ASD). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for intra-message ASD as described herein. For example, the communications manager 520 may include a first antenna transmission component 525, a second antenna transmission component 530, a first antenna reception component 535, a second antenna reception component 540, a message decoding component 545, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The first antenna transmission component 525 may be configured as or otherwise support a means for transmitting a first portion of a scheduled message within a time interval for the scheduled message using a first antenna element of the UE based on an intra-message antenna diversity configuration for the UE, the intra-message antenna diversity configuration indicating a set of multiple antenna elements including the first antenna element available for transmission of the scheduled message. The second antenna transmission component 530 may be configured as or otherwise support a means for transmitting, within the time interval, at least a second portion of the scheduled message using at least a second antenna element of the UE that is different from the first antenna element, the second portion transmitted based on the intra-message antenna diversity configuration.

Additionally, or alternatively, the communications manager 520 may support wireless communication at a first UE in accordance with examples as disclosed herein. The first antenna reception component 535 may be configured as or otherwise support a means for receiving, from a second UE, a first portion of a scheduled message within a time interval for the scheduled message, the first portion corresponding to a first antenna element of the second UE based on an intra-message antenna diversity configuration. The second antenna reception component 540 may be configured as or otherwise support a means for receiving, within the time interval, a second portion of the scheduled message corresponding to a second antenna element of the second UE that is different from the first antenna element based on the intra-message antenna diversity configuration. The message decoding component 545 may be configured as or otherwise support a means for decoding the first portion and the second portion of the scheduled message according to the intra-message antenna diversity configuration.

Figure 6:
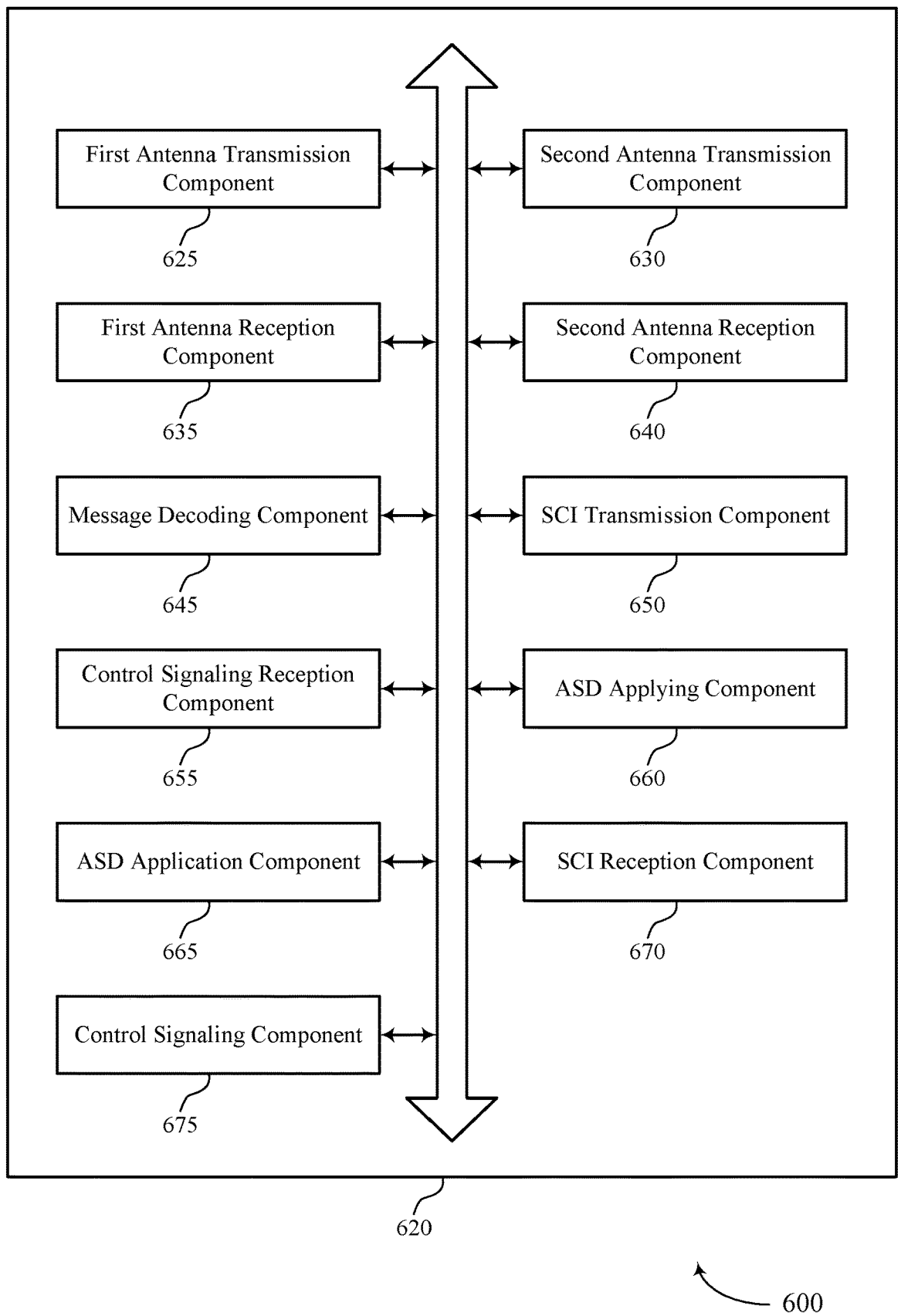
FIG. 6 shows a block diagram of a communications manager that supports techniques for intra-message ASD in accordance with aspects of the present disclosure.

FIG. 6 shows a block diagram 600 of a communications manager 620 that supports techniques for intra-message ASD in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for intra-message ASD as described herein. For example, the communications manager 620 may include a first antenna transmission component 625, a second antenna transmission component 630, a first antenna reception component 635, a second antenna reception component 640, a message decoding component 645, an SCI transmission component 650, a control signaling reception component 655, an ASD applying component 660, an ASD application component 665, an SCI reception component 670, a control signaling component 675, or any combination thereof. Each of these components may communicate, directly or indirectly, with one another (e.g., via one or more buses).

The communications manager 620 may support wireless communication at a UE in accordance with examples as disclosed herein. The first antenna transmission component 625 may be configured as or otherwise support a means for transmitting a first portion of a scheduled message within a time interval for the scheduled message using a first antenna element of the UE based on an intra-message antenna diversity configuration for the UE, the intra-message antenna diversity configuration indicating a set of multiple antenna elements including the first antenna element available for transmission of the scheduled message. The second antenna transmission component 630 may be configured as or otherwise support a means for transmitting, within the time interval, at least a second portion of the scheduled message using at least a second antenna element of the UE that is different from the first antenna element, the second portion transmitted based on the intra-message antenna diversity configuration.

In some examples, to support transmitting the second portion of the scheduled message, the second antenna transmission component 630 may be configured as or otherwise support a means for transmitting the second portion of the scheduled message using resources different from resources used for transmitting the first portion.

In some examples, to support transmitting the second portion of the scheduled message, the second antenna transmission component 630 may be configured as or otherwise support a means for transmitting the second portion of the scheduled message within the time interval using the second antenna element according to a frequency hopping pattern, where the first portion of the scheduled message is transmitted within the time interval using the first antenna element according to the frequency hopping pattern.

In some examples, the SCI transmission component 650 may be configured as or otherwise support a means for transmitting SCI indicating that the scheduled message is transmitted based on the intra-message antenna diversity configuration.

In some examples, the control signaling reception component 655 may be configured as or otherwise support a means for receiving control signaling from a base station configuring the intra-message antenna diversity configuration.

In some examples, the ASD applying component 660 may be configured as or otherwise support a means for applying the intra-message antenna diversity configuration based on a channel type of the scheduled message, an MCS of the scheduled message, a doppler spread of a channel for the scheduled message, a channel estimation for the channel, or any combination thereof.

In some examples, the ASD applying component 660 may be configured as or otherwise support a means for applying the intra-message antenna diversity configuration based on a resource allocation of the scheduled message.

In some examples, the ASD application component 665 may be configured as or otherwise support a means for applying the intra-message antenna diversity configuration to a subset of or all of a set of physical channels associated with the UE.

Additionally, or alternatively, the communications manager 620 may support wireless communication at a first UE in accordance with examples as disclosed herein. The first antenna reception component 635 may be configured as or otherwise support a means for receiving, from a second UE, a first portion of a scheduled message within a time interval for the scheduled message, the first portion corresponding to a first antenna element of the second UE based on an intra-message antenna diversity configuration. The second antenna reception component 640 may be configured as or otherwise support a means for receiving, within the time interval, a second portion of the scheduled message corresponding to a second antenna element of the second UE that is different from the first antenna element based on the intra-message antenna diversity configuration. The message decoding component 645 may be configured as or otherwise support a means for decoding the first portion and the second portion of the scheduled message according to the intra-message antenna diversity configuration.

In some examples, to support decoding the second portion of the scheduled message, the message decoding component 645 may be configured as or otherwise support a means for decoding the second portion of the scheduled message based on a second channel estimation associated with the second antenna element, where the first portion of the scheduled message is decoded based on a first channel estimation associated with the first antenna element.

In some examples, to support receiving the second portion of the scheduled message, the second antenna reception component 640 may be configured as or otherwise support a means for receiving the second portion of the scheduled message within the time interval according to a frequency hopping pattern, where in the first portion of the scheduled message is received within the time interval according to the frequency hopping pattern.

In some examples, the SCI reception component 670 may be configured as or otherwise support a means for receiving SCI indicating that the scheduled message is transmitted according to the intra-message antenna diversity configuration.

In some examples, the control signaling component 675 may be configured as or otherwise support a means for receiving control signaling from a base station configuring the intra-message antenna diversity configuration.

In some examples, the first portion of the scheduled message and the second portion of the scheduled message are decoded according to the intra-message antenna diversity configuration based on a channel type of the scheduled message, an MCS of the scheduled message, a doppler spread of a channel for the scheduled message, a channel estimation for the channel, or any combination thereof.

In some examples, the first portion of the scheduled message and the second portion of the scheduled message are decoded according to the intra-message antenna diversity configuration based on a resource allocation of the scheduled message.

Figure 7:
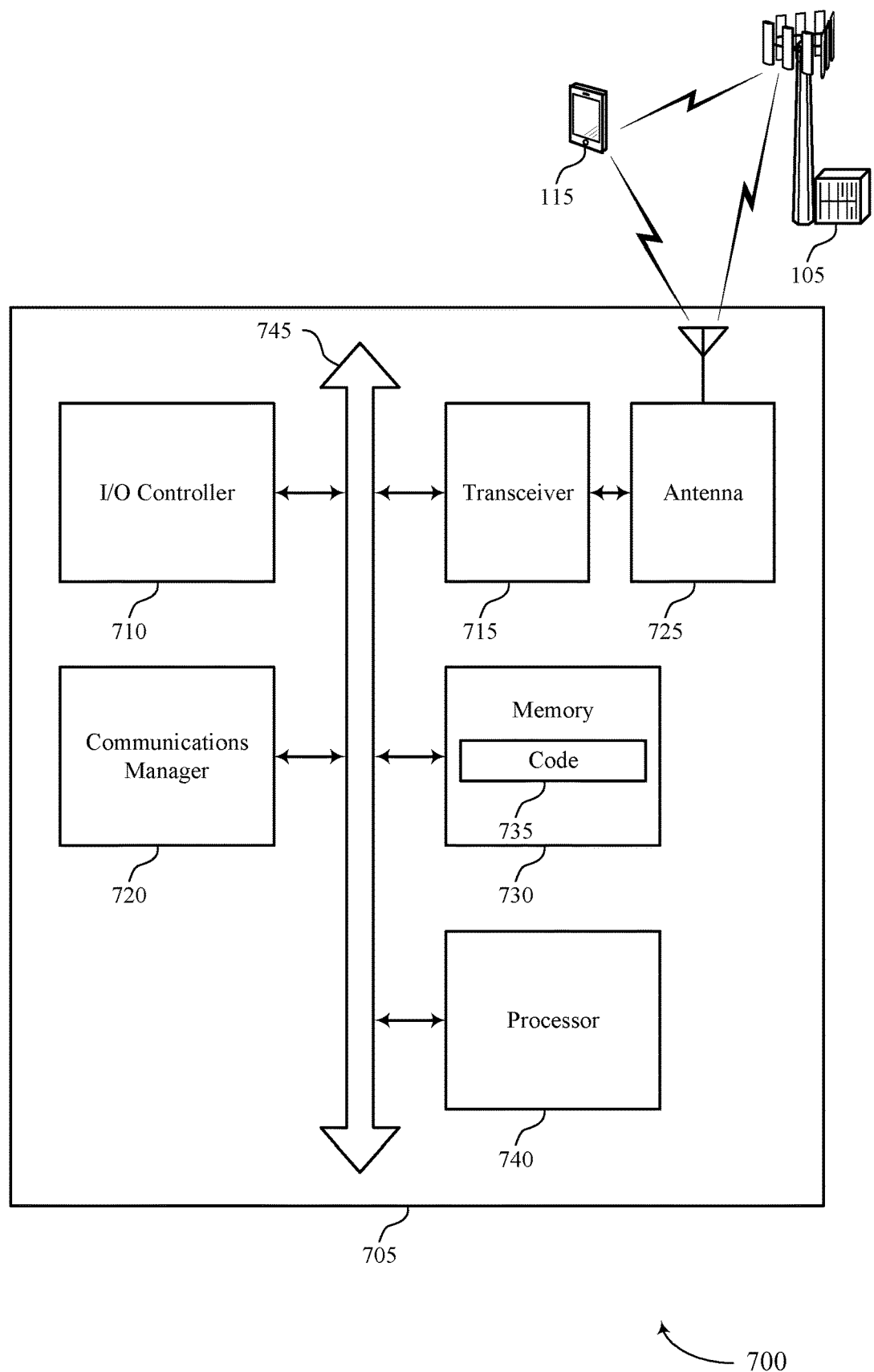
FIG. 7 shows a diagram of a system including a device that supports techniques for intra-message ASD in accordance with aspects of the present disclosure.

FIG. 7 shows a diagram of a system 700 including a device 705 that supports techniques for intra-message ASD in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random-access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for intra-message ASD). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for transmitting a first portion of a scheduled message within a time interval for the scheduled message using a first antenna element of the UE based on an intra-message antenna diversity configuration for the UE, the intra-message antenna diversity configuration indicating a set of multiple antenna elements including the first antenna element available for transmission of the scheduled message. The communications manager 720 may be configured as or otherwise support a means for transmitting, within the time interval, at least a second portion of the scheduled message using at least a second antenna element of the UE that is different from the first antenna element, the second portion transmitted based on the intra-message antenna diversity configuration.

Additionally, or alternatively, the communications manager 720 may support wireless communication at a first UE in accordance with examples as disclosed herein. For example, the communications manager 720 may be configured as or otherwise support a means for receiving, from a second UE, a first portion of a scheduled message within a time interval for the scheduled message, the first portion corresponding to a first antenna element of the second UE based on an intra-message antenna diversity configuration. The communications manager 720 may be configured as or otherwise support a means for receiving, within the time interval, a second portion of the scheduled message corresponding to a second antenna element of the second UE that is different from the first antenna element based on the intra-message antenna diversity configuration. The communications manager 720 may be configured as or otherwise support a means for decoding the first portion and the second portion of the scheduled message according to the intra-message antenna diversity configuration.

By including or configuring the communications manager 720 in accordance with examples as described herein, the device 705 may support techniques for a UE to use intra-message ASD, which may increase frequency diversity within a time interval. Intra-message ASD may improve the likelihood that a receiving UE may successfully receive and decode transmissions, and may improve overall transmission results. As such, supported techniques may include improved network operations and, in some examples, may promote network efficiencies, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for intra-message ASD as described herein, or the processor 740 and the memory 730 may be otherwise configured to perform or support such operations.

Figure 8:
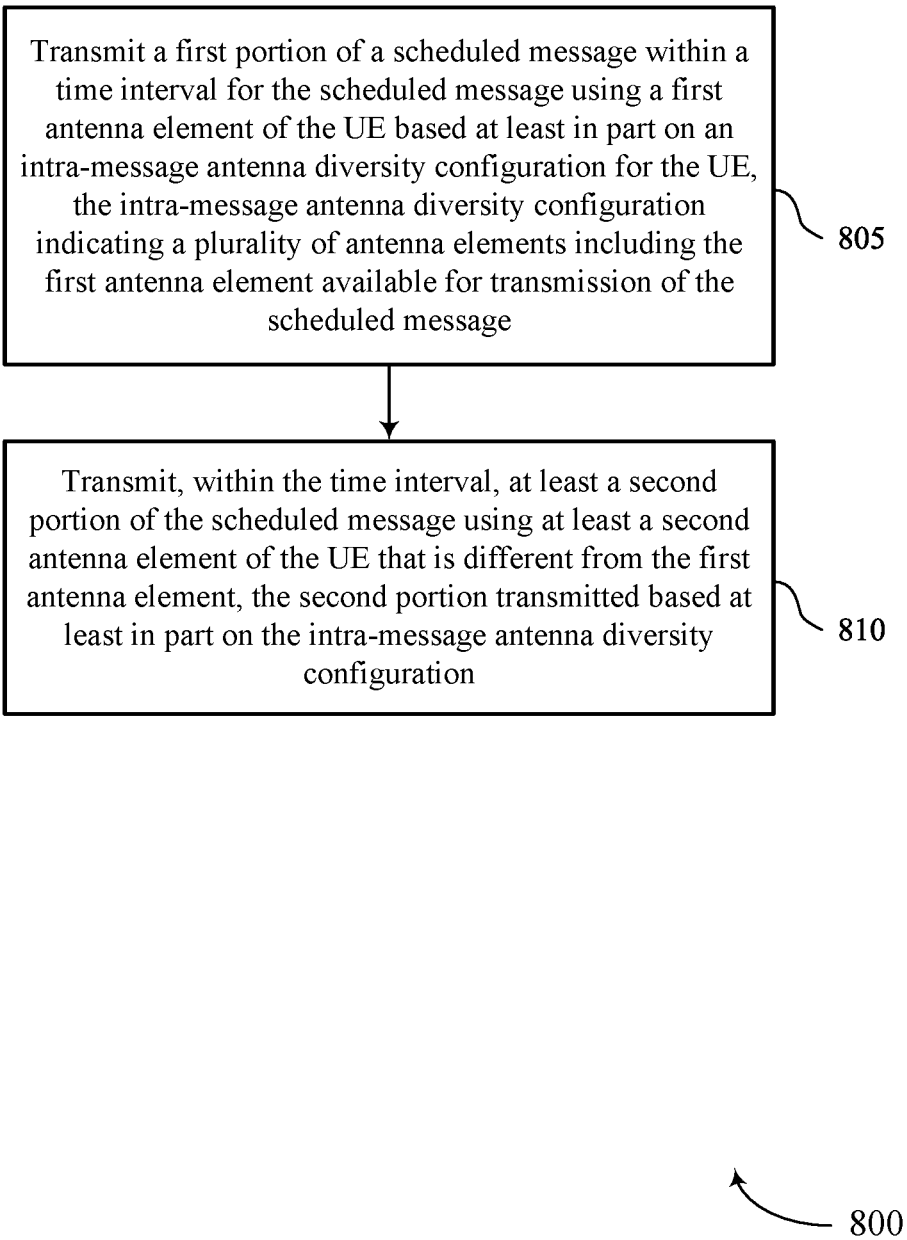
FIGS. 8 through 11 show flowcharts illustrating methods that support techniques for intra-message ASD in accordance with aspects of the present disclosure.

FIG. 8 shows a flowchart illustrating a method 800 that supports techniques for intra-message ASD in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include transmitting a first portion of a scheduled message within a time interval for the scheduled message using a first antenna element of the UE based on an intra-message antenna diversity configuration for the UE, the intra-message antenna diversity configuration indicating a set of multiple antenna elements including the first antenna element available for transmission of the scheduled message. The operations of 805 may be performed in accordance with examples as disclosed herein. In some examples, aspects of the operations of 805 may be performed by a first antenna transmission component 625 as described with reference to FIG. 6.

At 810, the method may include transmitting, within the time interval, at least a second portion of the scheduled message using at least a second antenna element of the UE that is different from the first antenna element, the second portion transmitted based on the intra-message antenna diversity configuration. The operations of 810 may be performed in accordance with examples as disclosed herein. In some examples, aspects of the operations of 810 may be performed by a second antenna transmission component 630 as described with reference to FIG. 6.

Figure 9:
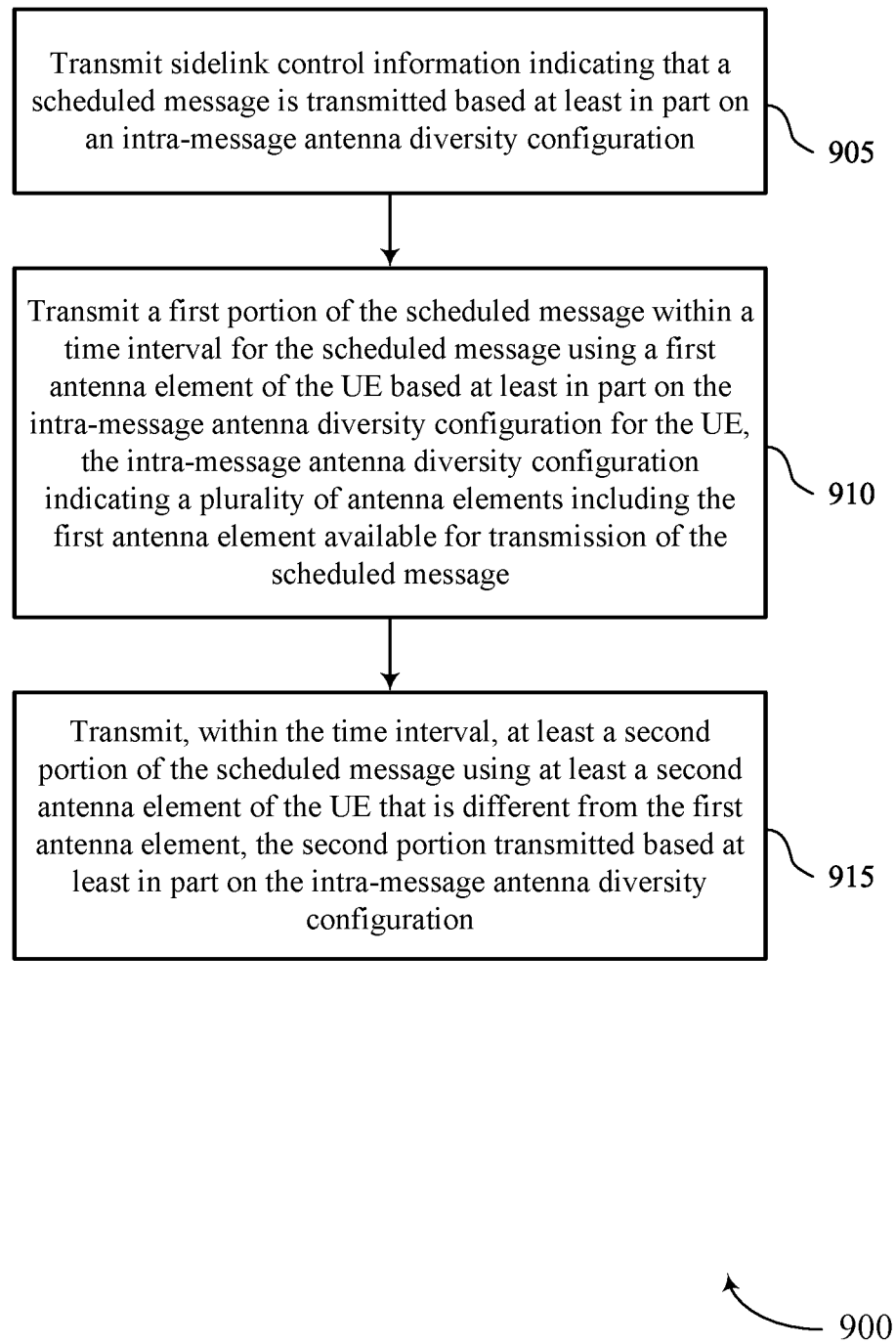

FIG. 9 shows a flowchart illustrating a method 900 that supports techniques for intra-message ASD in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include transmitting SCI indicating that the scheduled message is transmitted based on the intra-message antenna diversity configuration. The operations of 905 may be performed in accordance with examples as disclosed herein. In some examples, aspects of the operations of 905 may be performed by an SCI transmission component 650 as described with reference to FIG. 6.

At 910, the method may include transmitting a first portion of a scheduled message within a time interval for the scheduled message using a first antenna element of the UE based on an intra-message antenna diversity configuration for the UE, the intra-message antenna diversity configuration indicating a set of multiple antenna elements including the first antenna element available for transmission of the scheduled message. The operations of 910 may be performed in accordance with examples as disclosed herein. In some examples, aspects of the operations of 910 may be performed by a first antenna transmission component 625 as described with reference to FIG. 6.

At 915, the method may include transmitting, within the time interval, at least a second portion of the scheduled message using at least a second antenna element of the UE that is different from the first antenna element, the second portion transmitted based on the intra-message antenna diversity configuration. The operations of 915 may be performed in accordance with examples as disclosed herein. In some examples, aspects of the operations of 915 may be performed by a second antenna transmission component 630 as described with reference to FIG. 6.

Figure 10:
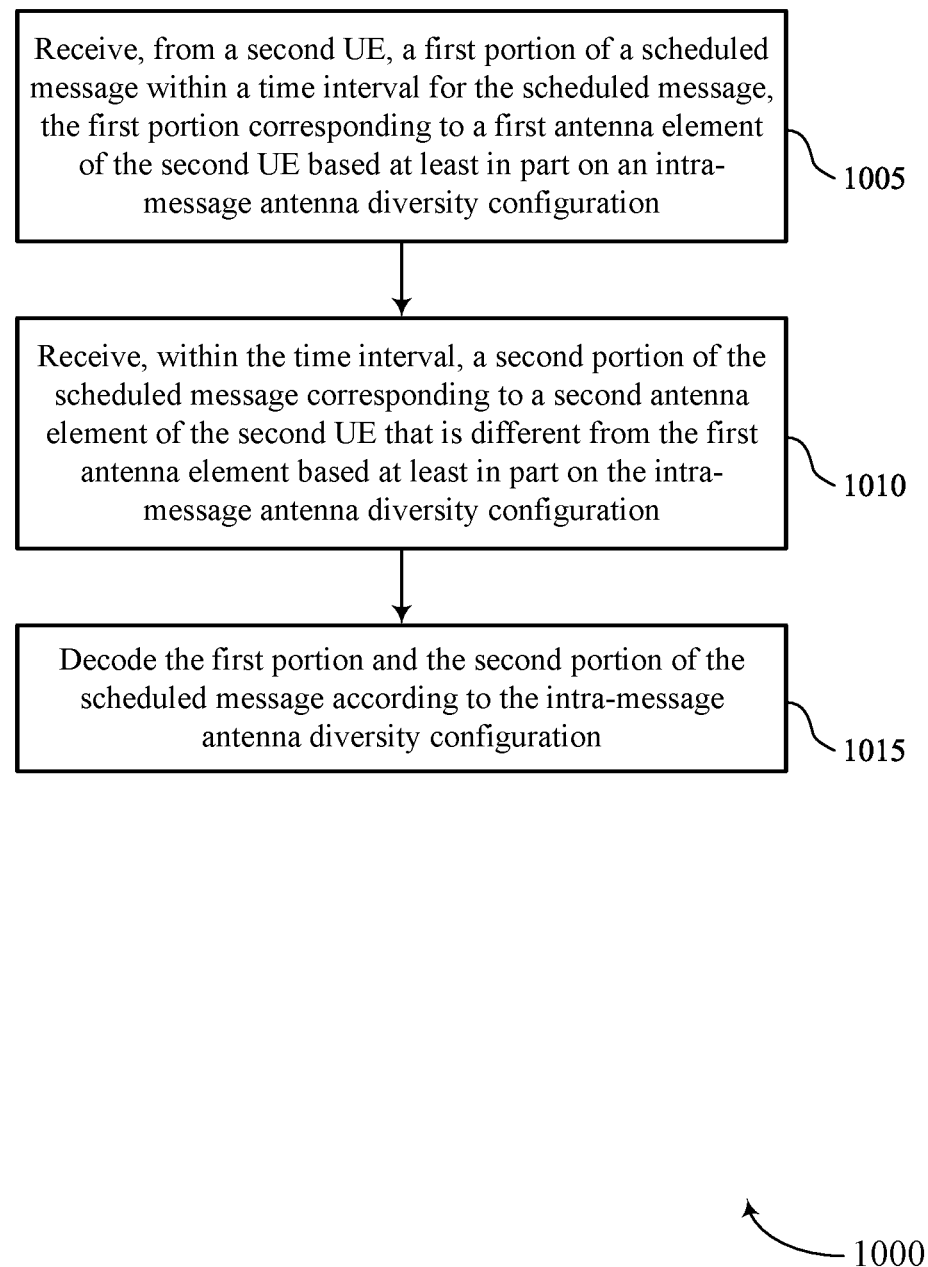

FIG. 10 shows a flowchart illustrating a method 1000 that supports techniques for intra-message ASD in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include receiving, from a second UE, a first portion of a scheduled message within a time interval for the scheduled message, the first portion corresponding to a first antenna element of the second UE based on an intra-message antenna diversity configuration. The operations of 1005 may be performed in accordance with examples as disclosed herein. In some examples, aspects of the operations of 1005 may be performed by a first antenna reception component 635 as described with reference to FIG. 6.

At 1010, the method may include receiving, within the time interval, a second portion of the scheduled message corresponding to a second antenna element of the second UE that is different from the first antenna element based on the intra-message antenna diversity configuration. The operations of 1010 may be performed in accordance with examples as disclosed herein. In some examples, aspects of the operations of 1010 may be performed by a second antenna reception component 640 as described with reference to FIG. 6.

At 1015, the method may include decoding the first portion and the second portion of the scheduled message according to the intra-message antenna diversity configuration. The operations of 1015 may be performed in accordance with examples as disclosed herein. In some examples, aspects of the operations of 1015 may be performed by a message decoding component 645 as described with reference to FIG. 6.

Figure 11:
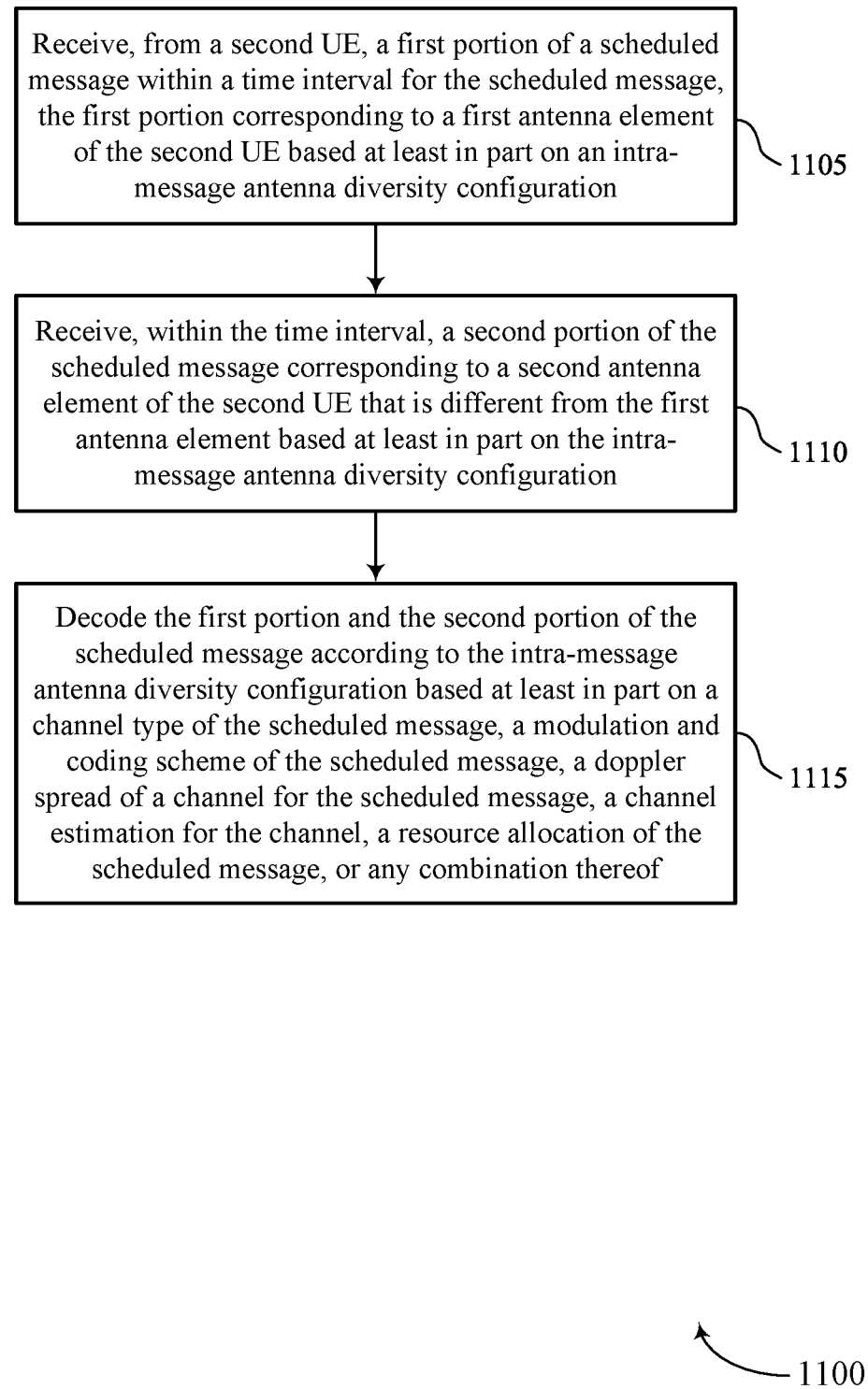

FIG. 11 shows a flowchart illustrating a method 1100 that supports techniques for intra-message ASD in accordance with aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1105, the method may include receiving, from a second UE, a first portion of a scheduled message within a time interval for the scheduled message, the first portion corresponding to a first antenna element of the second UE based on an intra-message antenna diversity configuration. The operations of 1105 may be performed in accordance with examples as disclosed herein. In some examples, aspects of the operations of 1105 may be performed by a first antenna reception component 635 as described with reference to FIG. 6.

At 1110, the method may include receiving, within the time interval, a second portion of the scheduled message corresponding to a second antenna element of the second UE that is different from the first antenna element based on the intra-message antenna diversity configuration. The operations of 1110 may be performed in accordance with examples as disclosed herein. In some examples, aspects of the operations of 1110 may be performed by a second antenna reception component 640 as described with reference to FIG. 6.

At 1115, the method may include the first portion of the scheduled message and the second portion of the scheduled message being decoded according to the intra-message antenna diversity configuration based on a channel type of the scheduled message, an MCS of the scheduled message, a doppler spread of a channel for the scheduled message, a channel estimation for the channel, or any combination thereof. The operations of 1115 may be performed in accordance with examples as disclosed herein. In some examples, aspects of the operations of 1115 may be performed by a first antenna reception component 635 as described with reference to FIG. 6.

The following provides an overview of aspects of the present disclosure:

Aspect 1: A method for wireless communication at a UE, comprising: transmitting a first portion of a scheduled message within a time interval for the scheduled message using a first antenna element of the UE based at least in part on an intra-message antenna diversity configuration for the UE, the intra-message antenna diversity configuration indicating a plurality of antenna elements including the first antenna element available for transmission of the scheduled message; and transmitting, within the time interval, at least a second portion of the scheduled message using at least a second antenna element of the UE that is different from the first antenna element, the second portion transmitted based at least in part on the intra-message antenna diversity configuration.

Aspect 2: The method of aspect 1, wherein transmitting the second portion of the scheduled message comprises: transmitting the second portion of the scheduled message using resources different from resources used for transmitting the first portion.

Aspect 3: The method of any of aspects 1 through 2, wherein transmitting the second portion of the scheduled message comprises: transmitting the second portion of the scheduled message within the time interval using the second antenna element according to a frequency hopping pattern, wherein the first portion of the scheduled message is transmitted within the time interval using the first antenna element according to the frequency hopping pattern.

Aspect 4: The method of any of aspects 1 through 3, further comprising: transmitting SCI indicating that the scheduled message is transmitted based at least in part on the intra-message antenna diversity configuration.

Aspect 5: The method of any of aspects 1 through 4, further comprising: receiving control signaling from a base station configuring the intra-message antenna diversity configuration.

Aspect 6: The method of any of aspects 1 through 5, further comprising: applying the intra-message antenna diversity configuration based at least in part on a channel type of the scheduled message, an MCS of the scheduled message, a doppler spread of a channel for the scheduled message, a channel estimation for the channel, or any combination thereof.

Aspect 7: The method of any of aspects 1 through 6, further comprising: applying the intra-message antenna diversity configuration based at least in part on a resource allocation of the scheduled message.

Aspect 8: The method of any of aspects 1 through 7, further comprising: applying the intra-message antenna diversity configuration to a subset of or all of a set of physical channels associated with the UE.

Aspect 9: A method for wireless communication at a first UE, comprising: receiving, from a second UE, a first portion of a scheduled message within a time interval for the scheduled message, the first portion corresponding to a first antenna element of the second UE based at least in part on an intra-message antenna diversity configuration; receiving, within the time interval, a second portion of the scheduled message corresponding to a second antenna element of the second UE that is different from the first antenna element based at least in part on the intra-message antenna diversity configuration; and decoding the first portion and the second portion of the scheduled message according to the intra-message antenna diversity configuration.

Aspect 10: The method of aspect 9, wherein decoding the second portion of the scheduled message comprises: decoding the second portion of the scheduled message based at least in part on a second channel estimation associated with the second antenna element, wherein the first portion of the scheduled message is decoded based at least in part on a first channel estimation associated with the first antenna element.

Aspect 11: The method of any of aspects 9 through 10, wherein receiving the second portion of the scheduled message comprises: receiving the second portion of the scheduled message within the time interval according to a frequency hopping pattern, where in the first portion of the scheduled message is received within the time interval according to the frequency hopping pattern.

Aspect 12: The method of any of aspects 9 through 11, further comprising: receiving SCI indicating that the scheduled message is transmitted according to the intra-message antenna diversity configuration.

Aspect 13: The method of any of aspects 9 through 12, further comprising: receiving control signaling from a base station configuring the intra-message antenna diversity configuration.

Aspect 14: The method of any of aspects 9 through 13, wherein the first portion of the scheduled message and the second portion of the scheduled message are decoded according to the intra-message antenna diversity configuration based at least in part on a channel type of the scheduled message, an MCS of the scheduled message, a doppler spread of a channel for the scheduled message, a channel estimation for the channel, a resource allocation of the scheduled message, or any combination thereof.

Aspect 15: The method of any of aspects 9 through 14, wherein the first portion of the scheduled message and the second portion of the scheduled message are decoded according to the intra-message antenna diversity configuration based at least in part on a resource allocation of the scheduled message.

Aspect 16: An apparatus for wireless communication at a UE, comprising a processor; memory coupled with the processor; and instructions stored in the memory and executable by the processor to cause the apparatus to perform a method of any of aspects 1 through 8.

Aspect 17: An apparatus for wireless communication at a UE, comprising at least one means for performing a method of any of aspects 1 through 8.

Aspect 18: A non-transitory computer-readable medium storing code for wireless communication at a UE, the code comprising instructions executable by a processor to perform a method of any of aspects 1 through 8.

Aspect 19: An apparatus for wireless communication at a first UE, comprising a processor; memory coupled with the processor; and instructions stored in the memory and executable by the processor to cause the apparatus to perform a method of any of aspects 9 through 15.

Aspect 20: An apparatus for wireless communication at a first UE, comprising at least one means for performing a method of any of aspects 9 through 15.

Aspect 21: A non-transitory computer-readable medium storing code for wireless communication at a first UE, the code comprising instructions executable by a processor to perform a method of any of aspects 9 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting a first portion of a scheduled message within a time interval for the scheduled message using a first antenna element of the UE based at least in part on an intra-message antenna diversity configuration for the UE, the intra-message antenna diversity configuration indicating a plurality of antenna elements available for transmission of the scheduled message, the plurality of antenna elements including the first antenna element; and
   transmitting, within the time interval for the scheduled message, at least a second portion of the scheduled message using a second antenna element of the UE that is different from the first antenna element based at least in part on the intra-message antenna diversity configuration, the plurality of antenna elements including the second antenna element.

2. The method of claim 1, wherein transmitting the second portion of the scheduled message comprises:
   transmitting the second portion of the scheduled message using resources different from resources used for transmitting the first portion.

3. The method of claim 1, wherein transmitting the second portion of the scheduled message comprises:
   transmitting the second portion of the scheduled message within the time interval using the second antenna element according to a frequency hopping pattern, wherein the first portion of the scheduled message is transmitted within the time interval using the first antenna element according to the frequency hopping pattern.

4. The method of claim 1, further comprising:
   transmitting sidelink control information indicating that the scheduled message is transmitted based at least in part on the intra-message antenna diversity configuration.

5. The method of claim 1, further comprising:
   receiving control signaling from a base station configuring the intra-message antenna diversity configuration.

6. The method of claim 1, further comprising:
   applying the intra-message antenna diversity configuration based at least in part on a channel type of the scheduled message, a modulation and coding scheme of the scheduled message, a doppler spread of a channel for the scheduled message, a channel estimation for the channel, or any combination thereof.

7. The method of claim 1, further comprising:
   applying the intra-message antenna diversity configuration based at least in part on a resource allocation of the scheduled message.

8. The method of claim 1, further comprising:
   applying the intra-message antenna diversity configuration to a subset of or all of a set of physical channels associated with the UE.

9. A method for wireless communication at a first user equipment (UE), comprising:
   receiving, from a second UE, a first portion of a scheduled message within a time interval for the scheduled message, the first portion corresponding to a first antenna element of the second UE based at least in part on an intra-message antenna diversity configuration, the intra-message antenna diversity configuration indicating a plurality of antenna elements available for transmission of the scheduled message, the plurality of antenna elements including the first antenna element;
   receiving, within the time interval for the scheduled message, at least a second portion of the scheduled message corresponding to a second antenna element of the second UE that is different from the first antenna element based at least in part on the intra-message antenna diversity configuration, the plurality of antenna elements including the second antenna element; and decoding the first portion and the second portion of the scheduled message according to the intra-message antenna diversity configuration.

10. The method of claim 9, wherein decoding the second portion of the scheduled message comprises:
decoding the second portion of the scheduled message based at least in part on a second channel estimation associated with the second antenna element, wherein the first portion of the scheduled message is decoded based at least in part on a first channel estimation associated with the first antenna element.

11. The method of claim 9, wherein receiving the second portion of the scheduled message comprises:
receiving the second portion of the scheduled message within the time interval according to a frequency hopping pattern, where in the first portion of the scheduled message is received within the time interval according to the frequency hopping pattern.

12. The method of claim 9, further comprising:
receiving sidelink control information indicating that the scheduled message is transmitted according to the intra-message antenna diversity configuration.

13. The method of claim 9, further comprising:
receiving control signaling from a base station configuring the intra-message antenna diversity configuration.

14. The method of claim 9, wherein the first portion of the scheduled message and the second portion of the scheduled message are decoded according to the intra-message antenna diversity configuration based at least in part on a channel type of the scheduled message, a modulation and coding scheme of the scheduled message, a doppler spread of a channel for the scheduled message, a channel estimation for the channel, or any combination thereof.

15. The method of claim 9, wherein the first portion of the scheduled message and the second portion of the scheduled message are decoded according to the intra-message antenna diversity configuration based at least in part on a resource allocation of the scheduled message.

16. An apparatus for wireless communication at a user equipment (UE), comprising:
a processor;
memory coupled with the processor; and
instructions stored in the memory and executable by the processor to cause the apparatus to:
transmit a first portion of a scheduled message within a time interval for the scheduled message using a first antenna element of the UE based at least in part on an intra-message antenna diversity configuration for the UE, the intra-message antenna diversity configuration indicating a plurality of antenna elements available for transmission of the scheduled message, the plurality of antenna elements including the first antenna element; and
transmit, within the time interval for the scheduled message, at least a second portion of the scheduled message using a second antenna element of the UE that is different from the first antenna element based at least in part on the intra-message antenna diversity configuration, the plurality of antenna elements including the second antenna element.

17. The apparatus of claim 16, wherein the instructions to transmit the second portion of the scheduled message are executable by the processor to cause the apparatus to:
transmit the second portion of the scheduled message using resources different from resources used for transmitting the first portion.

18. The apparatus of claim 16, wherein the instructions to transmit the second portion of the scheduled message are executable by the processor to cause the apparatus to:
transmit the second portion of the scheduled message within the time interval using the second antenna element according to a frequency hopping pattern, wherein the first portion of the scheduled message is transmitted within the time interval using the first antenna element according to the frequency hopping pattern.

19. The apparatus of claim 16, wherein the instructions are further executable by the processor to cause the apparatus to:
transmit sidelink control information indicating that the scheduled message is transmitted based at least in part on the intra-message antenna diversity configuration.

20. The apparatus of claim 16, wherein the instructions are further executable by the processor to cause the apparatus to:
receive control signaling from a base station configuring the intra-message antenna diversity configuration.

21. The apparatus of claim 16, wherein the instructions are further executable by the processor to cause the apparatus to:
apply the intra-message antenna diversity configuration based at least in part on a channel type of the scheduled message, a modulation and coding scheme of the scheduled message, a doppler spread of a channel for the scheduled message, a channel estimation for the channel, or any combination thereof.

22. The apparatus of claim 16, wherein the instructions are further executable by the processor to cause the apparatus to:
apply the intra-message antenna diversity configuration based at least in part on a resource allocation of the scheduled message.

23. The apparatus of claim 16, wherein the instructions are further executable by the processor to cause the apparatus to:
apply the intra-message antenna diversity configuration to a subset of or all of a set of physical channels associated with the UE.

24. An apparatus for wireless communication at a first user equipment (UE), comprising:
a processor;
memory coupled with the processor; and
instructions stored in the memory and executable by the processor to cause the apparatus to:
receive, from a second UE, a first portion of a scheduled message within a time interval for the scheduled message, the first portion corresponding to a first antenna element of the second UE based at least in part on an intra-message antenna diversity configuration, the intra-message antenna diversity configuration indicating a plurality of antenna elements available for transmission of the scheduled message, the plurality of antenna elements including the first antenna element;
receive, within the time interval for the scheduled message, at least a second portion of the scheduled message corresponding to a second antenna element of the second UE that is different from the first antenna element based at least in part on the intra-message antenna diversity configuration, the plurality of antenna elements including the second antenna element; and decode the first portion and the second portion of the scheduled message according to the intra-message antenna diversity configuration.

25. The apparatus of claim 24, wherein the instructions to decode the second portion of the scheduled message are executable by the processor to cause the apparatus to:
  decode the second portion of the scheduled message based at least in part on a second channel estimation associated with the second antenna element, wherein the first portion of the scheduled message is decoded based at least in part on a first channel estimation associated with the first antenna element.

26. The apparatus of claim 24, wherein the instructions to receive the second portion of the scheduled message are executable by the processor to cause the apparatus to:
  receive the second portion of the scheduled message within the time interval according to a frequency hopping pattern, where in the first portion of the scheduled message is received within the time interval according to the frequency hopping pattern.

27. The apparatus of claim 24, wherein the instructions are further executable by the processor to cause the apparatus to:
  receive sidelink control information indicating that the scheduled message is transmitted according to the intra-message antenna diversity configuration.

28. The apparatus of claim 24, wherein the instructions are further executable by the processor to cause the apparatus to:
  receive control signaling from a base station configuring the intra-message antenna diversity configuration.

29. The apparatus of claim 24, wherein the first portion of the scheduled message and the second portion of the scheduled message are decoded according to the intra-message antenna diversity configuration based at least in part on a channel type of the scheduled message, a modulation and coding scheme of the scheduled message, a doppler spread of a channel for the scheduled message, a channel estimation for the channel, or any combination thereof.

30. The apparatus of claim 24, wherein the first portion of the scheduled message and the second portion of the scheduled message are decoded according to the intra-message antenna diversity configuration based at least in part on a resource allocation of the scheduled message.

* * * * *